United States Patent [19]
DeMayo

[11] Patent Number: 6,138,906
[45] Date of Patent: Oct. 31, 2000

[54] METHOD OF INSTALLING AND IDENTIFYING THE LOCATIONS OF INSTALLED PRODUCTS

[75] Inventor: Joseph M. DeMayo, Ridgewood, N.J.

[73] Assignee: McBride & Costello, Inc., Ridgewood, N.J.

[21] Appl. No.: 08/368,379

[22] Filed: Jan. 4, 1995

Related U.S. Application Data

[63] Continuation of application No. 07/895,908, Jun. 9, 1992, abandoned.

[51] Int. Cl.[7] .................................................. G06F 17/00
[52] U.S. Cl. ............................................. 235/375; 235/487
[58] Field of Search ..................................... 235/375, 487

[56] References Cited

U.S. PATENT DOCUMENTS

| | | | |
|---|---|---|---|
| 3,848,112 | 11/1974 | Weichselbaum | 235/375 |
| 4,340,810 | 7/1982 | Glass | 235/375 |
| 4,460,824 | 7/1984 | Kadogaki | 235/375 |
| 4,614,366 | 9/1986 | North | 235/375 |
| 4,651,150 | 3/1987 | Katz | 235/375 |
| 4,908,761 | 3/1990 | Tai | 235/383 |
| 4,945,218 | 7/1990 | Talbott | 235/487 |

*Primary Examiner*—Harold I. Pitts
*Attorney, Agent, or Firm*—Galgano & Burke

[57] ABSTRACT

A simple, economical method of identifying the location of installed products. According to one embodiment, a machine readable indicia, for example a bar code, is associated with products from different product groups. Indicia is initially applied to each of the products in a manner such that the indicia is removable. As the end user installs those products, an installation team removes the removable indicia from the product or product package and adheres that indicia to an installation information sheet. The installation information sheet from that installation, as well as the installation information sheets from other installation sites, are then forwarded to a central location where the information on the machine-readable indicia is automatically read into an electronic database. Once the information from the machine-readable indicia has been entered into a suitable database, the information is readily accessible using a suitable software program.

18 Claims, 1 Drawing Sheet

METHOD OF INSTALLING AND IDENTIFYING THE LOCATIONS OF INSTALLED PRODUCTS

RELATED APPLICATIONS

This application is a continuation of Ser. No. 07/875,908, filed Jun. 9, 1992 now abandoned.

BACKGROUND OF THE INVENTION

The present invention is directed to a tracking system and, more particularly, to a method for installing products and tracking the location of products which have been installed at a number of remote locations.

Many large companies, particularly utilities, purchase products from many suppliers. The products are typically warehoused and then used as needed. For example, an electrical utility may purchase 50 spools of underground cable from one cable manufacturer at one time. The cable will then be installed underground at different locations within the utilities service area. Thus, over a given time period, products from a single supplier of that utility will be installed at many separate locations within the service area.

After products have been installed, it may be desirable to identify the location of those products for various reasons. For example, a supplier may notify the utility that a certain shipment of products contains manufacturing defects which shorten that product's service life. In such an instance, instead of risking a loss of service in areas utilizing that product, the utility will prefer to replace that installed product with an acceptable substitute. Since the products may have been originally installed at a large number of locations within the utilities service area, the utility must first identify the locations of that supplier's products.

Some methods previously utilized by utilities to keep track of the locations of products from different manufacturers are inefficient and excessively time-consuming. One method requires the utility's installation teams to complete a form for each installation with information relating to the job site, such as location, time and date of installation, names of the members of the installation team, the type of work performed, and the identity of products installed. This "work ticker" is then returned to a central location where it is filed along with similar forms.

It will be appreciated that the installation teams of large utilities generate hundreds of these forms per day and thousands of these forms every year. When it becomes desirable to identify the locations of a specific product made by a certain supplier, it is virtually impossible to examine the actual installation locations. Therefore, it has been necessary to physically review the large number of "work tickets" generated during the time period over which that company's product had been utilized. This task of physically reviewing the forms created over several years is monumental.

It is therefore desirable to provide a more efficient method for installing and tracking the location of installed products.

SUMMARY OF INVENTION

The present invention provides a simple, economical method of installing products and tracking the location of those installed products. According to one embodiment of the present invention, the supplier of a given product creates a machine-readable indicia, for example a bar code, and attaches that indicia to each of his products or the packaging of those products. According to this embodiment of the present invention, the indicia is initially applied to the product in a manner such that it is removable from the product and readily adherable to another item, such as a work ticket, at some time in the future.

The products containing those indicia are then shipped to the end user, e.g. a stility company. As the end user installs those products, the installation team removes the removable indicia from the product or product package and adheres that indicia to an installation information sheet, e.g. a work ticket. Since the installation may comprise the installation of a number of products, for example, ten different products, the installation information sheet will contain ten different indicia at the completion of the installation.

The installation information sheet from that installation, as well as the installation information sheets from other installation sites within the utility service area, are then preferably forwarded to a central location where the information on the machine-readable indicia is automatically read into an electronic database, for example, a computer equipped with a bar-code reader. The installation information sheets may then be filed for further reference. It will be appreciated by those skilled in the art that once the information from the machine-readable indicia is entered onto a suitable database, the information is advantageously readily accessible using a suitable software program.

According to an alternative embodiment of the present invention, the supplier permanently affixes a machine readable indicia to the product or the product's packaging. The installation team of the end user is equipped with a portable reader such as a portable computer equipped with a bar code scanner. In this embodiment, instead of removing the indicia from the product, the installation team simply scans the indicia, thereby recording the information into the portable computer. At the end of a given time period, the information stored within the portable computer is transferred into a centralized data base where it is stored for future accessing.

According to still another embodiment of the present invention, indicia are associated with either the product or the product's packaging as in the first embodiment, however, the machine-readable indicia is created by the end user upon receiving the products and before the products are installed by an installation team.

The various embodiments of the present invention provide a method for readily tracking the location of installed products originating from different locations. Utilizing a method of the present invention, an end user who has installed thousands of different products at thousands of different locations over a period of years can readily identify the location of a particular group of those products within minutes. These and other advantages will be apparent to those skilled in the art from the drawings and detailed description set forth below.

DETAILED DESCRIPTION

The present invention is designed to save valuable time and resources for end users of products supplied by many different suppliers. While examples of the present invention are described herein as tailored for use by a utility company such as an electric utility, the present invention is also useful for other private and public entities which install products originating from a large number of suppliers where those end users may have reason to locate those products after installation.

Figure 1:
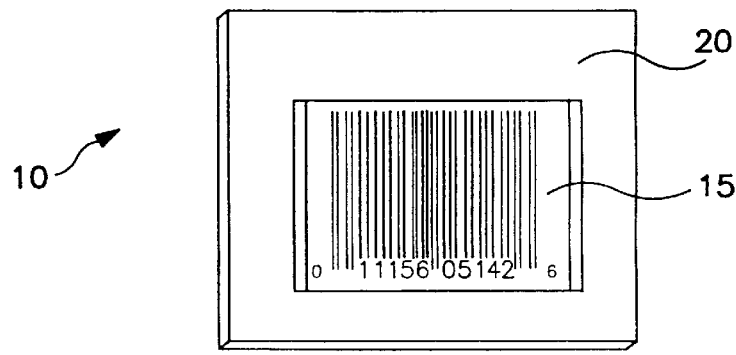
FIG. 1 is a perspective view of a label used with one embodiment of the present invention.

According to one preferred embodiment of the present invention, a label 10, shown in FIG. 1, having a removable, self-adhering bar code 15 is initially attached to backing 20. The bar code 15 is attached in such a manner that it may be readily removed from backing 20 and adhered to another surface, for example an installation information sheet. Backing 20 may also be provided with an adhesive backing for attaching label 10 to a product or product's packaging.

According to the method of this embodiment of the present invention, label 10 is adhered to the packaging of each product before a shipment of products is forwarded to the end user. The group of products may be stored at a central, warehouse location by the end user and then distributed to installation teams as those teams need these particular products. When an installation team takes a product having label 10 to an installation site, a member of the installation team removes bar code 15 from backing 20 and adheres bar code 15 directly to an installation information sheet. If more than one product is being installed during that particular installation, it is preferable that each product have been provided with a label, similar to label 10, having a bar code with information regarding the source of that product. After the installation, the installation information sheet, with the bar codes 15 attached, is forwarded to a location remote from the installation site where the bar codes are read by an automatic bar code reader and the information on the bar code is stored in an electronic database which allows the retrieval of the information when desired. In addition to the information contained within the bar code 15, other information relating to the particular installation, for example the location of the installation, the date of the installation, the identity of the installation team members is also entered into the database.

While the present embodiment has seen illustrated utilizing a bar code, any other type of machine readable indicia may also be utilized. The machine-readable indicia may comprise any information which may be desired at a future date by the end user. The information preferably comprises the identity of the supplier, and may also include the location of the supplier's plant, the piece or batch number of the particular product, and the time and/or date of the product's manufacture.

When a specific product is divisible such that portions of the product may be installed at a plurality of distinct installation sites, such as a large spool of electrical cable, each such product is preferably provided with enough labels 10 such that the installation crew at each installation site will be able to remove a bar code 15 for attachment to an installation information sheet.

Figure 2:
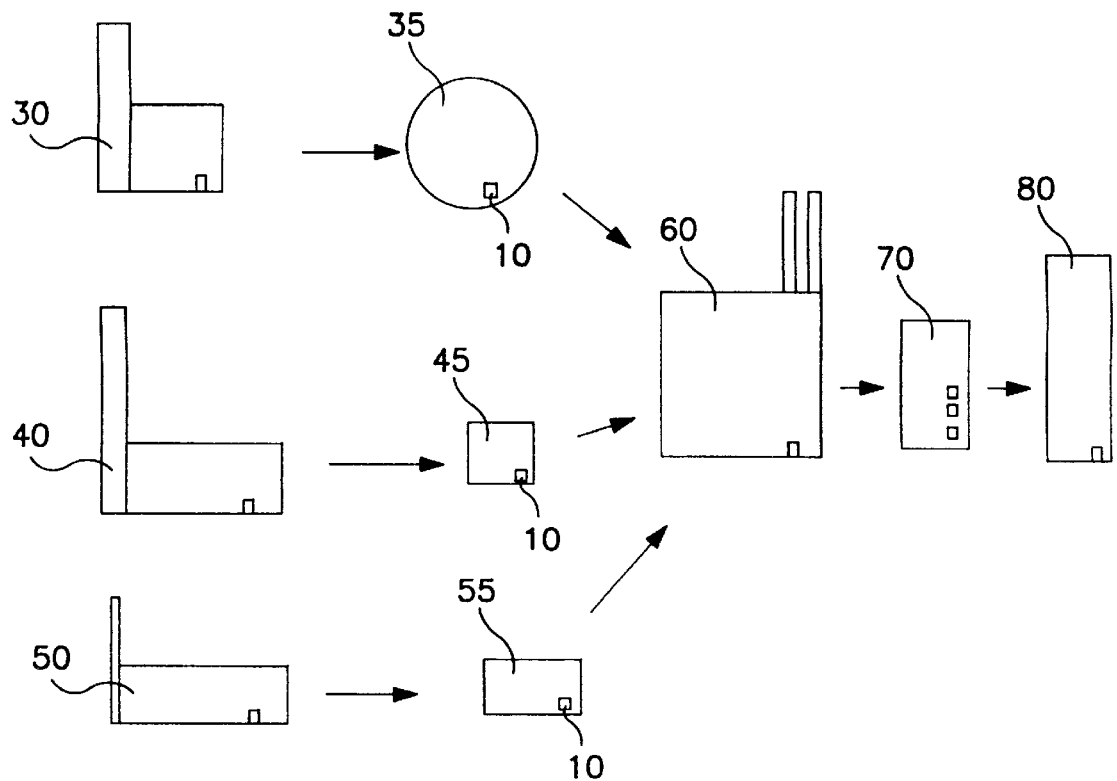
FIG. 2 is a schematic representation of one method of the present invention.

The method of this embodiment of the present invention is schematically illustrated in FIG. 2 wherein three separate suppliers 30, 40 and 50 manufacture three different products 35, 45, 55, respectively. Each product is provided with a label 10 respective suppliers. The end user then installs each of the three products 35, 45, and 55 at an installation site 60. For example, the three products may be installed underground below a road or within one of the end users' facilities such as a power generating facility. As used herein, the term "install" is intended to indicate that a given product is operatively positioned to perform the function for which that product was designed. During the installation, the machine-readable indicia 15 are removed from each of the different products and attached to an installation information sheet 70 which is then transferred to a central processing location 80, such as one of the end users offices. The information from the machine readable indicia 15 is then automatically transferred to an electronic data storage device, such as a computer.

According to another embodiment of the present invention, the installation teams of the end user may be provided with portable devices capable of automatically reading the bar codes 15 or other machine-readable indicia associated with the product. According to this embodiment, an installation team member scans the indicia with the portable device which stores the information from the indicia. After the installation, the information is transferred from the portable device to a centralized database where it is stored for future accessing.

While the previously described embodiments of the present invention minimize the work required by the end user, it is also contemplated within the scope of another embodiment of the present invention that the end user may create the indicia and associate those indicia to products as those products are received from suppliers. As used herein, the term "associate" is used to indicate that the machine-readable indicia is available for transferring to an installation worksheet, as in the embodiment described above, or for "reading" into a portable device capable of reading the indicia by an installation team member. For example, the label may be adhered directly to the product, attached to the packaging of the product, or may be placed within the packaging along with the product. Of course, products received from different suppliers will receive machine-readable indicia coded with different codes.

Once the information has been input into the database, it can be stored for months, years or longer and readily accessed within minutes whenever the end user desires information relating to the products or installation sites. For example, if a supplier notifies an end user that one batch of products made several years previously were defective, the end user can readily identify the locations where those products were installed. Alternatively, if the end user experiences problems at a number of installation sites, utilizing software well within the scope of those skilled in the art, the end user can readily cross-reference the installations done at those installation sites and determine whether the products of a single supplier had been utilized at each of the problem sites. These are just a few examples of the time-saving tasks which may be accomplished utilizing one of the methods of the present invention.

The methods of the present invention thereby provide an economical and rapid method for installing and identifying the location of installed products.

I claim:

1. A method for installing and identifying the location of operative elements of a larger system originating from different locations comprising the steps of:

providing removable, machine-readable indicia and associating said indicia with a plurality of said operative elements from a plurality of element groups, each of said element groups comprising a plurality of like elements having a common origin;

wherein said first plurality of indicia comprise information indicative of the origin of each of said operative elements such that indicia associated with elements from different element groups comprise different information;

transporting a first plurality of operative elements from different element groups to a first remote location;

removing each of said removable indicia from said first plurality of operative elements;

installing said operative elements thereby placing said operative elements into operative and cooperative engagement;

transporting said indicia from said first remote location to a second remote location;

electronically reading said information at said second remote location and storing said information in an electronic database which permits selective retrieval of said information.

2. A method of installing and identifying the location of operative elements of a larger system originating from different locations according to claim 1 wherein said indicia from said first plurality of operative elements are attached to an installation information sheet at said first remote location.

3. A method of installing and identifying the location of operative elements of a larger system originating from different locations according to claim 1 wherein said step of installing said operative elements comprises placing at least two of said products into electrical communication.

4. A method of installing and identifying the location of operative elements of a larger system originating from different locations according to claim 1 wherein said method comprises associating a plurality of said removable, machine-readable indicia with one of said operative elements.

5. A method of installing and identifying the location of operative elements of a larger system originating from different locations according to claim 1 wherein said machine readable indicia comprises a bar code.

6. A method of installing and identifying the location of operative elements of a larger system originating from different locations according to claim 1 wherein each of said machine-readable indicia are printed on a substrate which is removably attached to a label, said substrate comprising a self-adhesive backing, wherein said substrate may be removed from said label and adhered to another surface.

7. A method of installing and identifying the location of operative elements of a larger system originating from different locations according to claim 1 wherein said step of electronically reading said information comprises optically scanning said indicia.

8. A method for installing and identifying the location of operative elements of a larger system originating from different locations comprising the steps of:

associating machine-readable indicia with a plurality of elements from a plurality of elements groups, each of said elements groups comprising a plurality of like elements having a common origin;

wherein said first plurality of indicia comprise information indicative of the origin of each of said elements such that indicia associated with elements from different element groups comprise different information;

transporting a first plurality of elements from different element groups to a first remote location;

electronically reading said information on said indicia with a portable electronic reading device capable of temporarily storing said information and installing said elements thereby placing said elements into operative and cooperative engagement; and transporting said device to a second remote location and transferring said information into an electronic database which permits selective retrieval of said information.

9. A method of installing and identifying the location of operative elements of a larger system originating from different locations according to claim 9 wherein said step of installing said elements comprises placing at least two or said elements into electrical communication.

10. A method of installing and identifying the location of operative elements of a larger system originating from different locations according to claim 9 wherein said machine readable indicia comprises a bar code.

11. A method of installing and identifying the location of operative elements of a larger system originating from different locations according to claim 9 wherein said step of electronically reading said information comprises optically scanning said indicia.

12. A method for installing and identifying the location of a plurality of operative elements of a larger system comprising the steps of:

providing removable, machine-readable indicia and associating said indicia with a plurality of elements having a common origin;

wherein said indica comprise information indicative of the origin of each of said elements;

transporting a first plurality of said elements to a first remote location;

removing each of said removable indicia from said first plurality of elements;

a installing said operative elements thereby placing said operative elements into operative and cooperative engagement;

transporting said indicia from said first remote location to a second remote location;

electronically reading said information at said second remote location and storing said information in an electronic database which permits selective retrieval of said information.

13. A method of installing and identifying the location of operative elements of a larger system originating from different locations according to claim 12 wherein said indicia from said first plurality of elements are attached to an installation information sheet at said first remote location.

14. A method of installing and identifying the location of operative elements of a larger system originating from different locations according to claim 12 wherein said step of installing said elements comprises placing at least two of said products elements into electrical communication.

15. A method of installing and identifying the location of operative elements of a larger system originating from different locations according to claim 12 wherein said method comprises associating a plurality of said removable, machine-readable indicia with one of said elements.

16. A method of installing and identifying the location of operative elements of a larger system originating from different locations according to claim 12 wherein said machine readable indicia comprises a bar code.

17. A method of installing and identifying the location of operative elements of a larger system originating from different locations according to claim 12 wherein each of said machine-readable indicia are printed on a substrate which is removably attached to a label, said substrate comprising a self-adhesive backing, wherein said substrate may be removed from said label and adhered to another surface.

18. A method of installing and identifying the location of operative elements of a larger system originating from different locations according to claim 12 wherein said step of electronically reading said information comprises optically scanning said indicia.

\* \* \* \* \*